United States Patent [19]
Rokutan

[11] Patent Number: 5,184,337
[45] Date of Patent: Feb. 2, 1993

[54] OPTICAL RECORDING/REPRODUCING APPARATUS HAVING MEANS FOR PERIODICALLY SUPERVISING DRIVE CURRENT SUPPLIED TO ACTUATOR

[75] Inventor: Takao Rokutan, Higashimurayama, Japan

[73] Assignee: Olympus Optical Co., Ltd., Tokyo, Japan

[21] Appl. No.: 716,878

[22] Filed: Jun. 18, 1991

[30] Foreign Application Priority Data

Jun. 19, 1990 [JP] Japan .................. 2-162436

[51] Int. Cl.⁵ .............................................. G11B 7/00
[52] U.S. Cl. .................. 369/44.25; 369/44.33
[58] Field of Search ............... 369/43, 44.32, 44.33, 369/44.25, 124

[56] References Cited

U.S. PATENT DOCUMENTS 4,982,392 1/1991 Soejima ........................... 369/44.33

FOREIGN PATENT DOCUMENTS 57-150144 9/1982 Japan.
58-189840 11/1983 Japan.
63-33207 7/1988 Japan.

Primary Examiner—Donald McElheny, Jr.
Attorney, Agent, or Firm—Armstrong, Westerman, Hattori, McLeland & Naughton

[57] ABSTRACT

The results output from a comparator, which makes a comparison to determine whether or not the drive current to be supplied to a focusing/tracking actuator of an optical system in which light beams are condensed and applied to an optical recording medium, are counted in each supervisory period at periodical intervals. If the counted value is larger than a predetermined value, supply of the drive current to the actuator is cut so as to prevent burning or the like of the actuator by the supplied excessively large electric current.

22 Claims, 8 Drawing Sheets

FIG.11 (a') 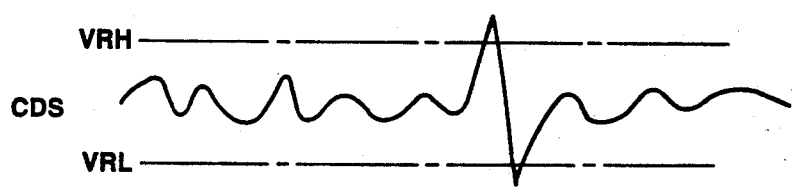
FIG.11 (b') 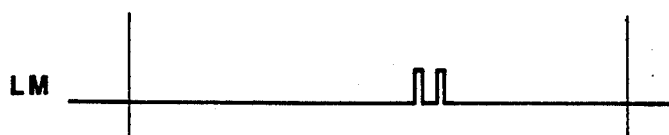
FIG.11 (c')
FIG.11 (d') 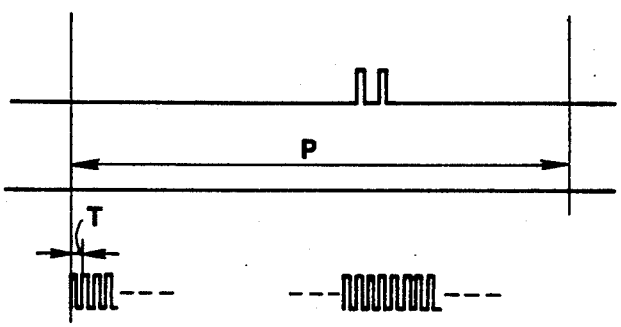
FIG.11 (e') 

OPTICAL RECORDING/REPRODUCING APPARATUS HAVING MEANS FOR PERIODICALLY SUPERVISING DRIVE CURRENT SUPPLIED TO ACTUATOR

BACKGROUND OF THE INVENTION

Field of the Invention and Related Art Statement

The present invention relates to an optical recording/reproducing apparatus having means for protecting an actuator included therein by periodically supervising a drive current supplied to the actuator.

As the optical recording/reproducing apparatus, there have been available an optical disk recording/reproducing apparatus and an optical card recording/reproducing apparatus. A conventional structure of the optical card recording/reproducing apparatus of the above-described type will now be described.

As shown in FIG. 1, an optical card 1 has a data recording portion 2 in which, guide tracks 3 are disposed at predetermined intervals as shown in FIG. 2 so that data is recorded to tracks 4 each of which is formed between adjacent guide tracks 3.

The optical card recording/reproducing apparatus comprises: focus servo means for controlling a recording/reproducing beam to be focused on the recording medium; and track servo means for controlling the recording/reproducing beam to be positioned at the central portion of the track. Therefore, the optical card recording/reproducing apparatus must use a focus error signal denoting the deviation from the focused point and a track error signal denoting the positional deviation from the central portion of the track.

FIG. 3 illustrates an example of the optical system of an optical head 30 for use in the above-described optical card recording/reproducing apparatus. Light beams emitted from a laser diode 5 are made to be parallel beams by a collimator lens 6 before they are sectioned into three beams by a diffraction grating 7. The beams are condensed onto the surface of the optical card 1 by a condensing lens 8 so that data is recorded/reproduced. In this state, the structure is arranged in such a manner that the axis of the beam made incident upon the recording medium and that of the reflected beam are deviated from each other with respect to the central axis of the condensing lens (objective lens) 8. The reflected beams are reflected by a mirror 9 before they pass through a detection lens 10 so as to be applied to a photo-detector 11.

FIG. 4 illustrates the photo-detector 11 and the beams received by the same. Referring to FIG. 4, a photo-detector element which receives a central beam (main beam) 15a of the three beams is sectioned into two portions.

Beams 16a and 17a (sub-beams) are respectively received by photo-detector elements 13 and 14 so as to be used to detect the track error signal.

When the beams are focused, the beam 15a is positioned at the central portion of the bisectioned photo-detector 11, the beam being shifted, due to the deviation of the axes, in directions designated by arrows when the interval between the condensing lens 8 and the optical card 1 is changed. FIG. 5 illustrates the beams positioned on the optical card 1, where the beams 15a, 16a and 17a shown in FIG. 4 correspond to 15b, 16b and 17b.

Therefore, as shown in FIG. 6, the output from a subtracter 26, which calculates the difference between the output from the photo-detector element 11a and that from the photo-detector element 11b, is made to be the focus error signal.

As for the track error signal, the output from a subtracter 18 which calculates the difference between the photo-detector elements 13 and 14 as shown in FIG. 7 is made to be the track error signal because the quantity of reflection of each of the beams 16a and 17a on the photodetector elements 13 and 14 from the tracks 3 is changed depending upon the positions of the beams on the tracks.

The condensing lens 8 is, by a lens drive portion 12, driven in directions respectively designated by arrows F and T shown in FIG. 3.

FIG. 8 is a block diagram which illustrates a track servo system according to the conventional technology.

The outputs from the photo-detector elements 13 and 14 are subjected to the subtraction operation performed by the subtracter 18 so that the output from the subtracter 18 is made to be the track error signal, the track error signal acting to drive a track actuator 21 via a relay 20 after it has passed through a drive amplifier 19. As a result, the track servo system is closed and thereby a servo loop is constituted.

Although the servo loop acts in a normal state, the drive current output from the drive amplifier 19 is excessively increased (the servo has been removed) if defects such as dust or a damage present on the optical card 1 or external vibrations or an impact exceeds an allowable level. As a result, the excessively large electric current continues to pass through the coil of the track actuator 21, causing the coil or its support member to be burnt due to the heat generated in the coil.

Accordingly, there has been a conventional structure as disclosed in Japanese Patent Publication No. 63-33207 in which the DC component of the drive current is detected by a DC voltage detector 27 so as to be subjected to a comparison with predetermined comparison levels VRH and VRL in comparators 24a and 24b. Furthermore, if the DC component deviates from the above-described level, the limit signal is made to be active with respect to a CPU 25, the CPU then immediately turning off the relay 20 so as to cut the supply of the electric current to the track actuator 21, whereby the actuator is protected.

According to the above-described conventional structure, the excessive rotation of the tracking mirror is prevented by detecting the DC component of the drive current.

If the servo has been removed because the dust or the damage present on the optical card 1 or the external vibrations or the impact exceeds the allowable level, the drive current continues to increase in one direction, causing two cases to occur: a case in which the DC component of the drive current increases and a case in which the direction in which the drive current passes alternately changes because the servo loop oscillates.

In the former case in which the DC component increases, the abnormality can be detected so as to protect the actuator according to the above-described conventional structure disclosed in Japanese Patent Publication No. 63-33207. However, since the DC component is substantially zero in the latter case in which the servo loops oscillates, the abnormality cannot be detected by the above-described conventional structure. Therefore, there arises a fear that the coil can be burnt.

Furthermore, if the generation of the oscillation cannot be detected during the recording of information, the recording is continued in an undesirable state in which the light beam spot deviates from a desired position. Therefore, in a case where the information recorded at the deviated position is reproduced, the obtainable signal level is unsatisfactorily low, causing a reproduction signal displaying a low S/N to be generated. As a result, problems arise in that read error will easily take place and reading cannot be performed.

OBJECT AND SUMMARY OF THE INVENTION

An object of the present invention is to provide an optical recording/reproducing apparatus capable of assuredly protecting an actuator by detecting an abnormality in a case where the DC component has been increased or the oscillation has taken place because the servo has been removed due to the defects such as dust or vibrations.

Another object of the present invention is to provide an optical recording/reproducing apparatus capable of preventing a fact that recording is continued at a position deviated from a desired position while simplifying the structure of the circuit.

According to the present invention, a fact whether or not a drive current is deviated from a predetermined range is checked in a predetermined period at every predetermined intervals, the drive current being a current to be supplied to an actuator means for displacing at least a portion of a light condensing irradiation means, which condenses and applies a light beam to an optical recording medium, with respect to the optical recording means in a direction in which focusing is adjusted or a direction transversing a track. If the number of times, at which the drive current exceeds the predetermined range, exceeds a reference number of times, the supply of the drive current to the actuator means is cut. As a result, the abnormality can be detected to assuredly protect the actuator means in cases where the servo has been removed, a DC component has been increased, the DC component is substantially zero and thereby oscillation has taken place.

Other and further objects, features and advantages of the invention will be appear more fully from the following description.

BRIEF DESCRIPTION OF THE DRAWINGS

FIGS. 1 to 8 respectively illustrate a conventional structure, among which

FIG. 1 illustrates an optical card;

FIG. 2 is a partial enlarged view which illustrates the structure shown in FIG. 1;

FIG. 3 is a structural view which illustrates the optical system of an optical card recording/reproducing apparatus;

FIG. 4 illustrates a photo-detector for use in the apparatus shown in FIG. 3;

FIG. 5 illustrates beam spots applied to the optical card;

FIGS. 6 and 7 respectively illustrate a subtracter for generating a focus error signal and a track error signal;

FIG. 8 is a structural view which illustrates a track servo according to the conventional structure;

FIGS. 9 to 13 respectively illustrate a first embodiment of the present invention, among which FIG. 9 is a structural view which illustrates a track servo system according to the first embodiment of the present invention;

FIG. 10 is a block diagram which illustrates a functional structure of a CPU;

FIGS. 11(a) to 11(e'), 12(a) to 12(d) and 13(a) to 13(d) respectively illustrate the operation of the first embodiment of the present invention;

FIGS. 14 and 15(a), 15(D) respectively illustrate a second embodiment of the present invention, among which FIG. 14 is a structural view which illustrates an essential portion of the second embodiment of the present invention;

FIG. 15(a) to 15(d) illustrate the operation of the second embodiment of the present invention;

FIGS. 16 and 17(a) to 17(D) respectively illustrate a third embodiment of the present invention, among which FIG. 16 is a structural view which illustrates an essential portion of the third embodiment of the present invention;

FIG. 17(a) to 17(d) illustrate the operation of the third embodiment of the present invention.

DETAILED DESCRIPTION OF PREFERRED EMBODIMENTS

Figure 1:
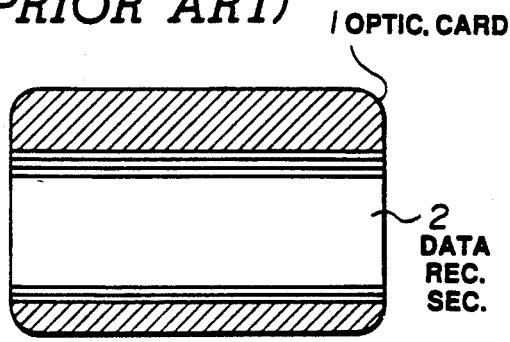
Figure 2:
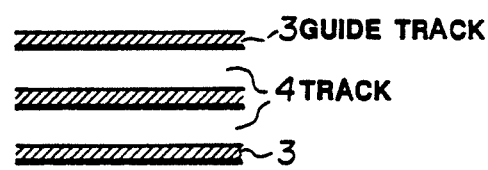
Figure 3:
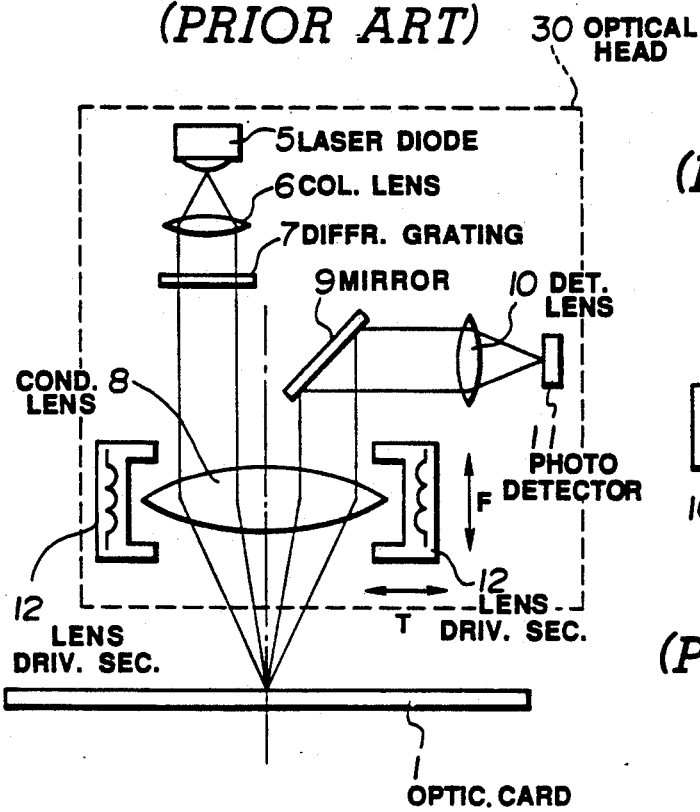
Figure 4:
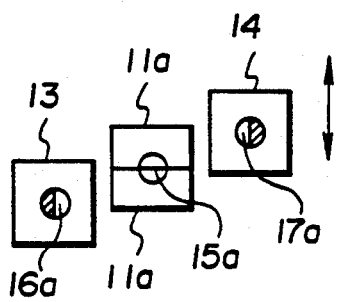
Figure 5:
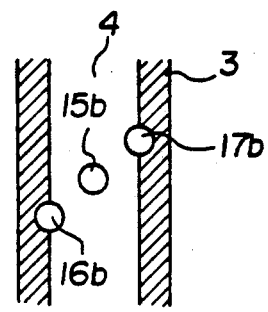
Figure 6:
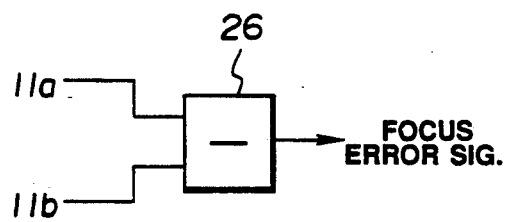
Figure 7:
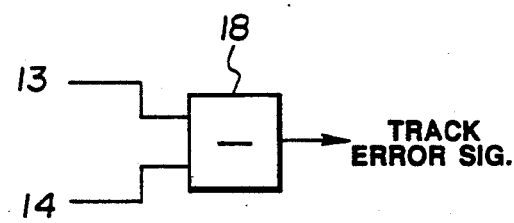

An optical recording/reproducing apparatus according to a first embodiment of the present invention is an optical card recording/reproducing apparatus having, for example, the optical system as shown in FIG. 3. Therefore, the optical card structured as shown in FIG. 1 is used as the optical recording medium for use in the apparatus according to this embodiment.

Figure 8:
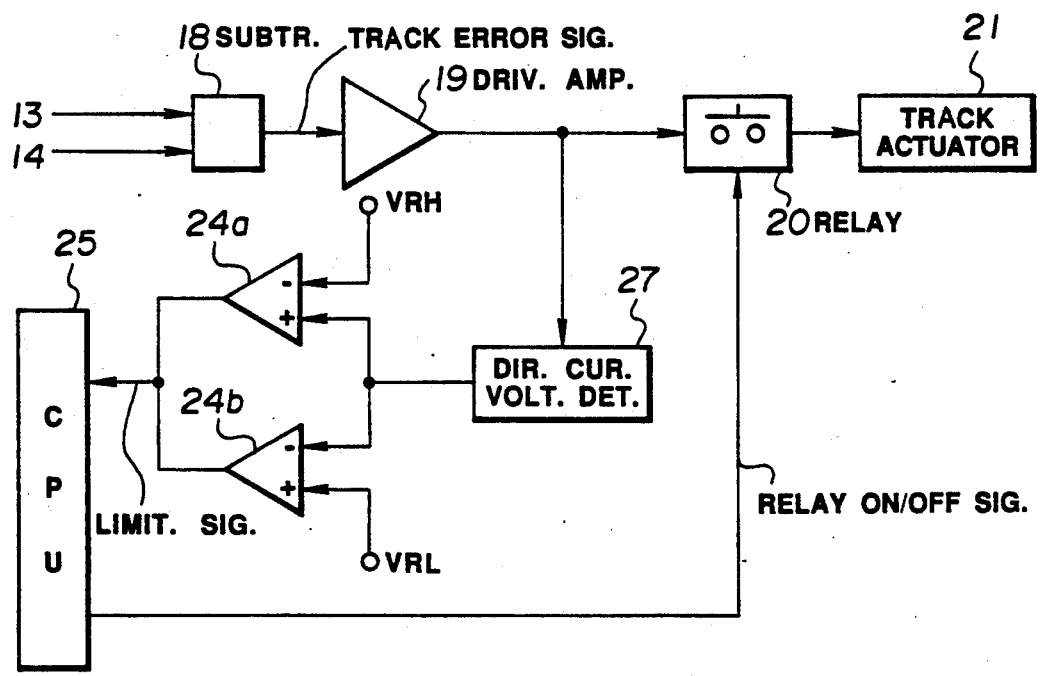
Figure 9:
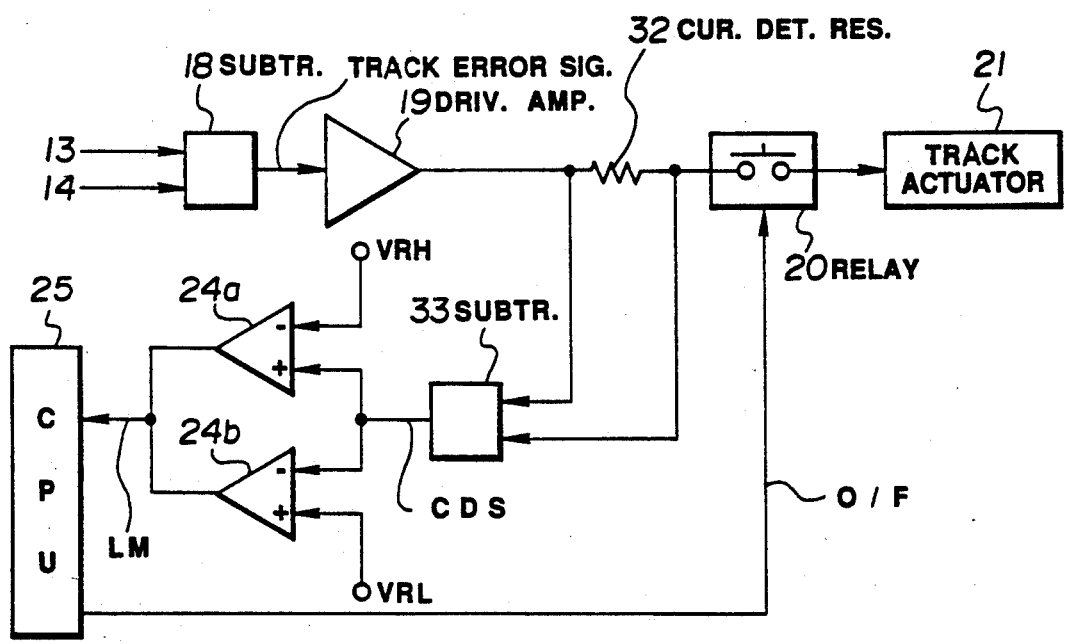

Furthermore, the optical card recording/reproducing apparatus according to this embodiment has a track servo system arranged as shown in FIG. 9, where the same elements as those according to the conventional structure shown in FIG. 8 are given the same reference numerals.

Similarly to the conventional structure shown in FIG. 8, the outputs from the photo-detectors 13 and 14 are received by the subtracter 18 from which a signal denoting the difference is extracted so as to serve as the track error signal. The track error signal thus-obtained is then supplied to the drive amplifier 19 in which the electric current of the track error signal is amplified. The electric current output from the drive amplifier 19 is supplied to a current detection resistor 32. A drive current, which has passed through the current detection resistor 32, is arranged to drive the track actuator 21 via the electromagnetic relay 20. Therefore, when the contact of the above-described relay 20 is closed, a track servo control state, in which the track servo loop is closed, is realized, causing the beam spot condensed and applied to the optical card 1 to be maintained at a tracking state in which tracks are tracked.

The potential at each of the two end portions of the above-described current detection resistor 32 is received by a subtracter 33 so that a signal possessing a voltage level which is in proportion to the drive current, that is, a current detection signal CDS is obtained. That is, when the contact of the relay 20 is closed, the drive current to be supplied to the track actuator 21 passes through the current detection resistor 32 so that a voltage drop of a quantity, which is in proportion to the above-described drive current, is generated and thereby the quantity of the voltage drop thus-generated is detected by the subtracter 33.

The above-described current detection signal CDS is supplied to non-inverted and inverted input terminals of the comparators 24a and 24b which constitute a window comparator so as to be subjected to comparisons with predetermined comparison levels VRH and VRL supplied to other input terminals. In the window comparator, a comparison (discrimination) is made whether or not the current detection signal is included in a predetermined range (in this case, a range between VRL and VRH). If it is not included in the above-described range, a limit signal LM of, for example, "H" is output, the limit signal LM being arranged to be supplied to the CPU 25 (the port of the CPU 25).

The CPU 25 checks (detects) whether or not the level of the port to which the limit signal LM is supplied is active, that is, "H" at a predetermined time interval T (for example, 0.01 seconds) in each of check periods (supervisory periods) P (for example, 1 second), the time interval T being shorter than the check period P. Furthermore, the CPU 25 counts the number of times at which the level is "H". Specifically, the signal supplied to the port is fetched at the predetermined interval T, the fetched signal "H" or "L" being then registered in, for example, a register. In this state, an assumption is made that the number of times at which the level is active in each of the check periods P is C. In a case where the number of times C is larger than a predetermined number of times L (for example, 30 times), a determination is made that an abnormal fact has taken place, and a relay ON/OFF signal O/F to be supplied to the relay 20 is brought to a relay OFF level so as to cut (turn off) the relay 20. As a result, burning of the track actuator 21 can be prevented. The determination whether or not the above-described number of times C is larger than the predetermined number of times L is made depending upon whether or not the value registered (accumulated) in the register in a time period from the start of each of the check periods to the end of the same is larger than L. If it is larger than L, a signal for causing the relay 20 to be turned off is output.

Figure 10:
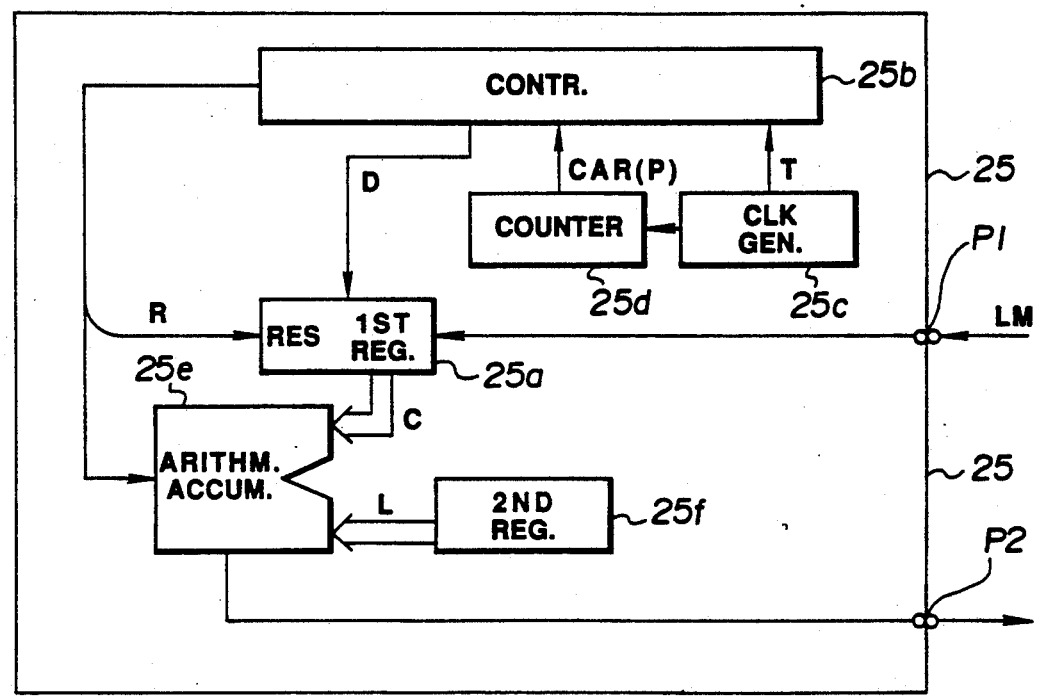

The functional structure of the CPU for performing the above-described operations will now be described with reference to FIG. 10. The limit signal LM received through a first port P1 is supplied to a first register 25a so that the number of times at which the level of the port is "H" is accumulated (the accumulation is made while making "H" to be 1 and "L" to be 0) at the predetermined interval T under the control performed by a controller 25b. That is, the controller 25b causes the first register 25a to accumulate the number of times at which the limit signal LM is "H" whenever a clock, the period of which is the predetermined interval T, is supplied from a clock generator 25c to the controller 25b.

The clock generated by the clock generator 25c is also supplied to a counter 25d so as to be divided by, for example, n, casing a carrier pulse CAR, which is output in each of the check periods P, to be supplied to the controller 25b. Whenever the above-described carrier pulse CAR is supplied, the controller 25b transmits an instruction signal D to an arithmetic operation accumulator (or a comparator) 25e so as to cause it to make a comparison whether or not the accumulated number of times C in the first register 25a is larger than the reference number of times L stored in a second register 25f. If the result of the comparison thus-made is C>L, the accumulator 25e, through a second port P2, outputs a signal which causes the relay 20 to be turned off. The controller 25b transmits a signal R for resetting the first register 25a after it has output the signal for causing the accumulator 25e to make the above-described comparison.

The above-described check period P is established in such a manner that burning can be prevented even if an excessively large electric current is, for the above-described period P, supplied to the track actuator 21 for use to perform the track servo.

By turning off the relay 20 in a case where the number of times C at which the limit signal is active in each of the above-described check periods P is larger than the predetermined number of times L, passing of the electric current for a time period, which is unsatisfactorily longer than the check period P, can be prevented.

The operation of the first embodiment will now be described with reference to FIGS. 11 to 13.

Figure 11:
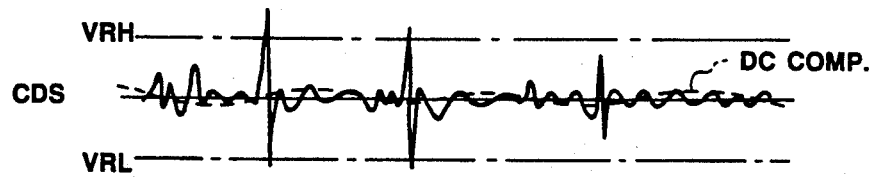
Figure 11:
Figure 11:
Figure 11:
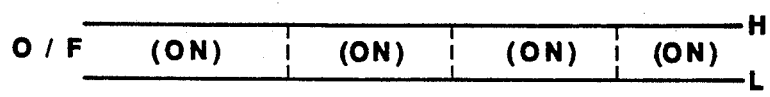

FIG. 11 illustrates a state where the track servo acts normally. The current detection signal CDS shown in FIG. 11(a) sometimes deviates from the comparison levels VRH and VRL. The reason for this lies in that the track error signal is deviated (the track servo is not deviated) due to a small defect taken place on the surface of the optical card. Therefore, the above-described electric current does not burn the track actuator 21. The DC component in this case is maintained at about zero.

Since the number of times at which the limit signal LM shown in FIG. 11(b) becomes active in the check period P shown in FIG. 11(c) are considerably smaller than the predetermined number of times L, the relay ON/OFF signal O/F is maintained at "H" as shown in FIG. 11(d). Therefore, the relay 20 is maintained at the state in which it is turned on. The above-described state is shown in FIGS. 11(a') to 11(f') in a changed time scale, among which FIGS. 11(a') to 11(c') respectively illustrate the states shown in FIGS. 11(a) to 11(c) while changing the time scale. FIG. 11(e') illustrates a detection period T in the check period P, while FIG. 11(f') illustrates the detected number of times C.

Figure 12:
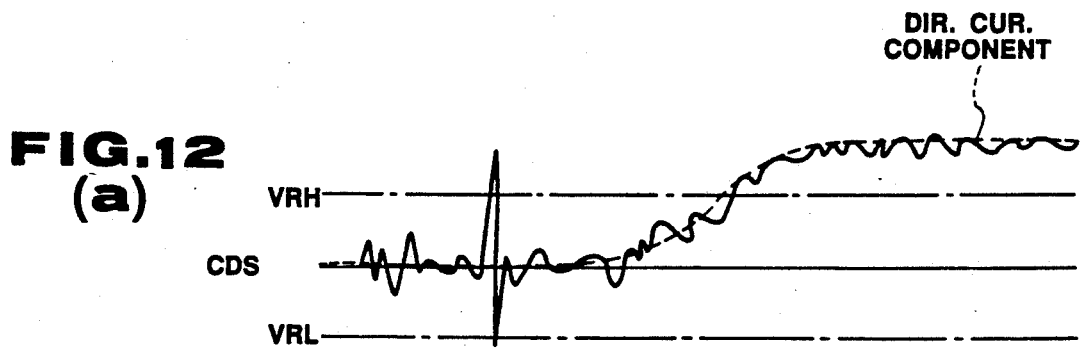
Figure 12:
Figure 12:
Figure 12:

FIG. 12 illustrates a state where an abnormal fact has taken place in that a detectable DC component has increased in the conventional structure shown in FIG. 8. As shown in FIG. 12, when the servo is deviated, the current detection signal CDS and its DC component are increased, causing the limit signal LM to be maintained at the active state.

Since the limit signal LM is, according to the first embodiment, fetched at every predetermined interval T, the active state is detected at each time of the above-described fetching operation. Therefore, since the number of times C at which the limit signal LM becomes active in the check period P is larger than L, the CPU determines an abnormal fact has taken place and turns off the relay 20. As a result, the track actuator 21 is protected.

Figure 13:
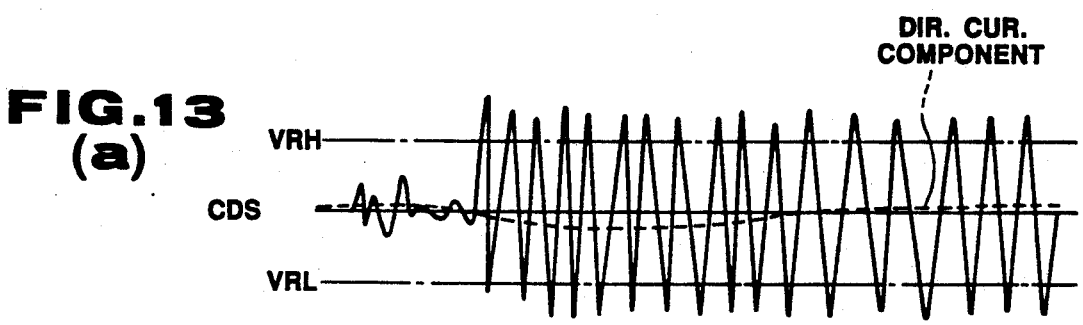
Figure 13:
Figure 13:
Figure 13:
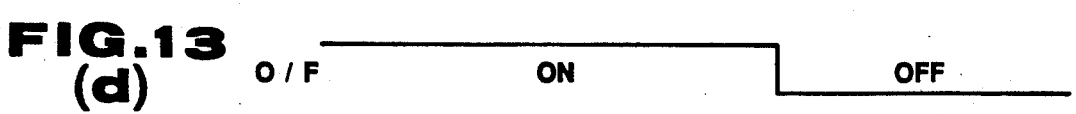

FIG. 13 illustrates a state in which an electric current is being passed through the track actuator 21 due to the oscillation of the servo system. As shown in FIG. 13, the DC component is maintained at about zero. Therefore, the conventional detection method cannot detect it.

On the contrary, according to the first embodiment, since the limit signal LM is arranged to be fetched at every predetermined interval T, the number of times C at which the limit signal LM becomes active increases substantially in proportion to the lapse of time from the start of the check period. Therefore, it is made larger than the predetermined number of times L after the check period P (Specifically, in a state of oscillation as shown in FIG. 13A, since the limit signal LM has substantially equal period "H" and period "L", when sampling has been performed 100 times, the "H" state is realized substantially 50 times, which is sufficiently larger than a predetermined number of times L, for example, 30 times, this oscillatory abnormality being assuredly detected so as to protect the track actuator 21).

As described above, according to the first embodiment, the signal corresponding to the electric current for driving the track actuator 21 is fetched at the predetermined interval T so as to obtain the number of times C at which the deviation from the established range in the check period P has taken place. The relay 20 is turned on/off in accordance with the determination made whether or not the above-described number of times C is larger than the reference number of times L. Therefore, an oscillatory abnormal fact can be detected as well as the deviation of the track error signal in a DC manner. Therefore, burning of the track actuator 21 can be assuredly prevented.

According to the first embodiment, the number of times at which the limit signal LM has become active in the predetermined check period P is counted. Furthermore, if the a determination is made that the counting value is larger than the predetermined reference number of times L, the determination is made that an abnormal fact has taken place, and the relay 20 is thereby turned off.

Therefore, the operation of turning off the relay 20 must be performed at the end of the check period P.

Figure 15:
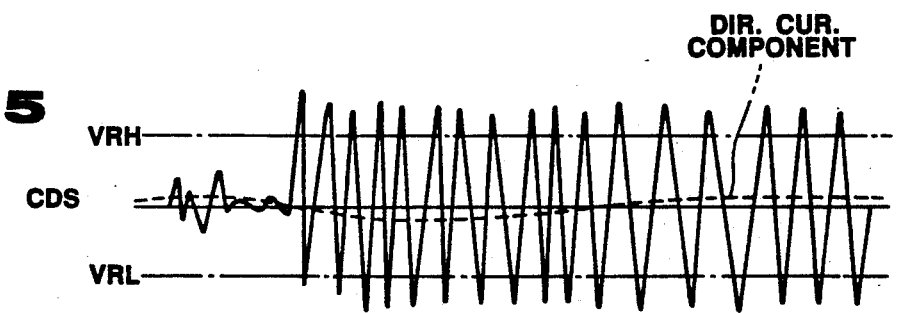
Figure 15:
Figure 15:
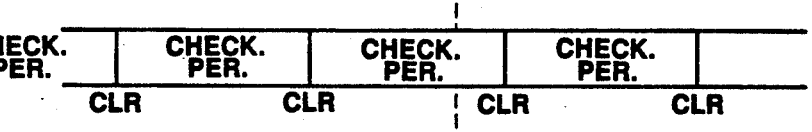
Figure 15:
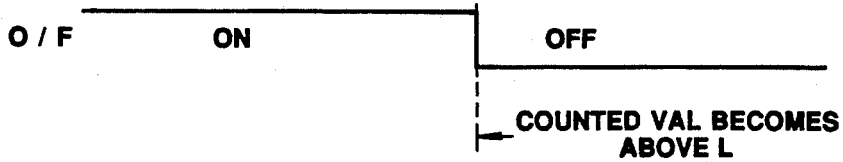

A second embodiment is, as shown in FIG. 15, arranged in such a manner that the number of times C is cleared at the beginning of each of the check periods P so as to count the number of times at which the active state has been realized. If the number of times C becomes larger than the predetermined reference number of times L, the relay 20 is immediately turned off so as to protect the track actuator 21.

Figure 14:
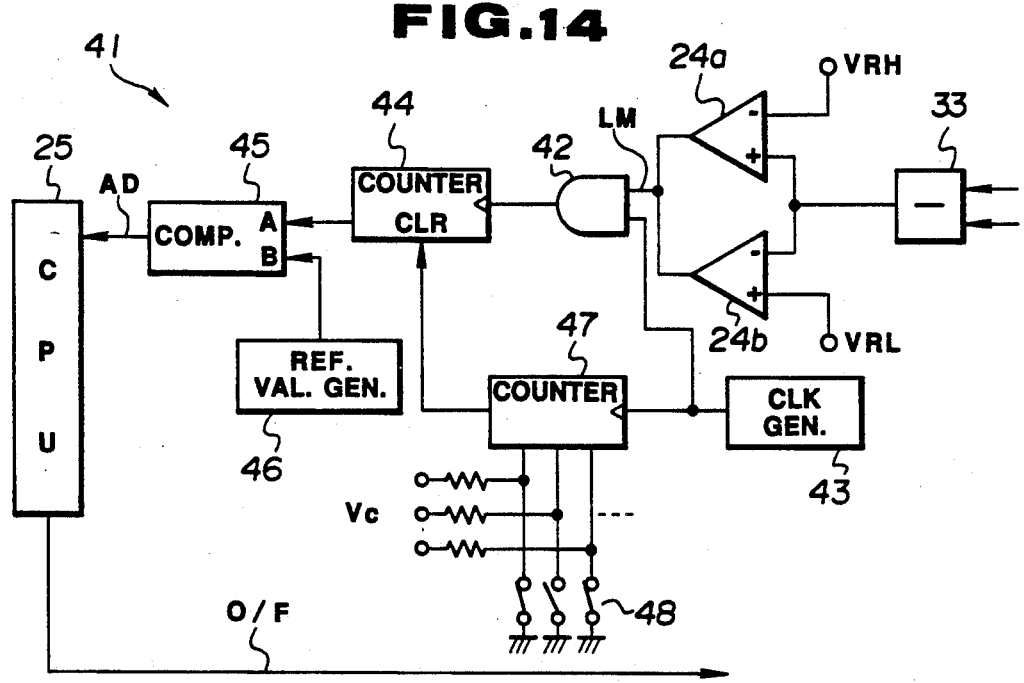

An essential portion of the protection circuit 41 is shown in FIG. 14.

The limit signal LM output from the comparators 24a and 24b is supplied to an AND circuit 42. The AND circuit 42 also receives a clock signal generated in a clock generator 43. Therefore, when the limit signal LM has become active, the clock signal is, via the AND circuit 42, received by a first counter 44. The result of the counting operation performed by the first counter 44 is supplied to an input terminal A of a comparator 45, while another input terminal B receives the reference value L output from a reference value generating circuit 46. The comparator 45 outputs an abnormality detection signal to an interruption terminal INT of the CPU 25 if the value C obtained at the input terminal A is larger than the value L at the input terminal B.

The above-described clock signal is a clock signal the period of which is the predetermined interval T according to the first embodiment. The clock signal according to this embodiment is formed into, for example, a rectangular wave (duty of 50% or more) the width of "H" of which is longer than that of "L". Therefore, if the limit signal has become "H" in a shorter time width, this signal is arranged to be counted by the counter 44.

The above-described clock signal is directly received by a second counter 47 which can be preset by combining the state of turning on/off of a plurality of switch elements by means of a dip switch 48 because the second counter 47 has, for example, a preset terminal. When the result of the counting of the clock signals has reached the above-described presetting level, the counter 47 supplies a borrow output to the clear terminal of the first counter 44 to clear it. Therefore, the present value corresponds to the check period P according to the first embodiment.

Also the reference value generating circuit 46 may be constituted by the dip switch 48 and the like. Furthermore, a structure may be employed in which a counter possessing a presetting function is used to serve as the first counter 44 while eliminating the comparator 45, wherein the borrow output from the counter 44 is supplied to, for example, the interruption terminal of the CPU 25 to interrupt the CPU 25 so that the rely 20 is turned off.

As shown in FIG. 15, according to the second embodiment, when the counted value C made by the first counter 44, which has been cleared at the beginning of each of the check periods P becomes larger than the reference value L (as well as a case before the end of the check period P), the comparator 45 outputs the abnormality detection signal AD to the CPU 25. In response to the abnormality detection signal AD thus-supplied, the CPU 25 outputs a signal which causes the relay 20 to be turned off. As a result, ensuing passing of the drive current through the track actuator is prevented so as to protect the track actuator 21.

Although the structure of the second embodiment is different from the first embodiment, the structure arranged similarly to the first embodiment may be employed, resulting the similar operation to be performed.

In this case, the operation is repeated in which the signals fetched through the port at the predetermined interval T are accumulated by an accumulator, the result of the accumulation is made to be the value of this accumulator and a comparison is made whether or not the accumulated value is larger than the reference value L. If it is larger than the reference value L, the relay 20 is turned off.

In addition, the structure according to the first embodiment is employed to perform an intermediate operation between the first embodiment and the second embodiment. That is, although the second embodiment which employes the structure shown in FIG. 1 is arranged to perform the accumulation and the comparison at the predetermined interval T, the comparison may be made at the intervals each of which is an integral multiple of T.

Furthermore, according to the above-described embodiment, the track servo system is employed to make the description. However, the present invention can be applied to a focus servo system similarly and as well as it can be applied to both the track servo system and the focus servo system. Then, a third embodiment in which the present invention is applied to both the track servo system and the focus servo system will now be described with reference to FIG. 16.

Figure 16:
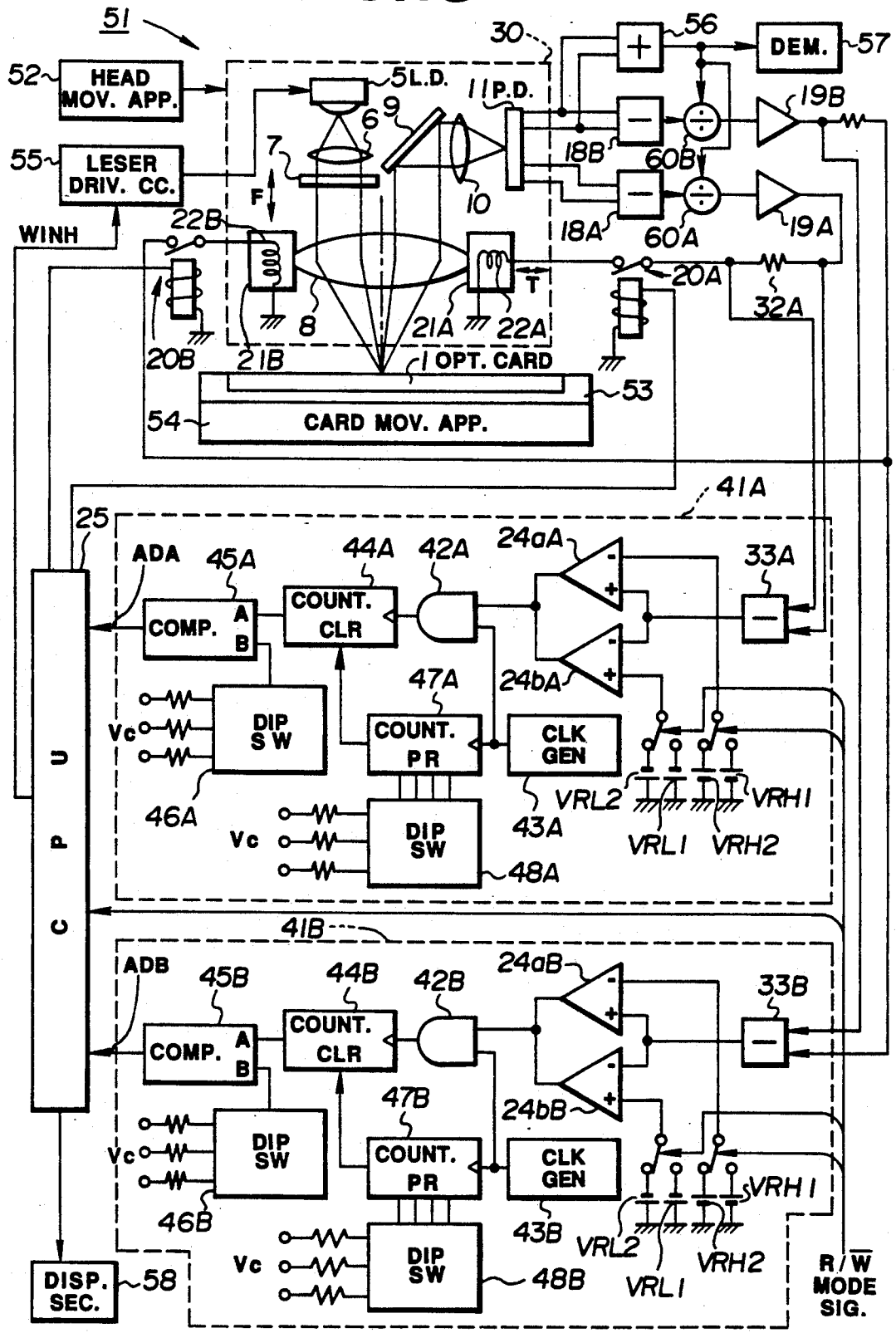

An optical card apparatus 51 according to the third embodiment is arranged in such a manner that the optical head 30 is disposed to confront the optical card 1. The optical head 30 is, by a head moving device 52 comprising a motor or the like, able to move in direction T which transverses the track, the optical head 30 being used to perform a seeking operation from the present track to the aiming track. The optical card 1 is mounted on a carriage 53 so as to be reciprocated in the direction of the track (a direction perpendicular to the surface of the drawing sheet on which FIG. 16 is drawn) by a card moving device 54. As a result, information can be recorded/reproduced to and from the track which is irradiated with the light beam applied via the condensing lens 8.

In a recording mode in which information is recorded to the track, a pulse-shape drive signal, which corresponds to information to be recorded and which has been modulated, is supplied to the laser diode 5 via a laser drive circuit 55. In response to the pulse-shape drive signal, the quantity of light emitted from the laser diode 5 is changed, causing information to be recorded to the track. In a reproduction mode in which the recorded information is reproduced, a substantially constant weak drive signal is supplied to the laser diode 5 via the laser drive circuit 55. In response to the drive signal thus-supplied, the laser diode 5 emits the laser beam before it is reflected by the optical card 1 to be received by the photo-detector 11 (the photo-detector elements 11a of the photo-detector 11) in which it is then photo-electrically converted. The output from the photo-detector 11 obtained by the photoelectrical conversion is subjected to the arithmetic operation so as to be a reproduction signal before it is supplied to a decoding circuit 57.

As described above, the output from the photo-detector 11 (the photo-detector elements 11a of the photo-detector 11) obtained by the photo-electrical conversion is supplied to a subtracter 18A (the track servo system is given a symbol A, while the focus servo system is given a symbol B) so that the track error signal is generated. The track error signal is amplified by an amplifier 19A after it has passed through a subtracter 60A before it is supplied to an actuator coil 22A of a track actuator 21A via a resistor 32A and the switch of a relay 20A. The voltage levels at the two end terminals of the resistor 32A are supplied to a track servo system protection circuit 41A. The above-described subtracter 60A subtracts the track error signal by an output signal from an adder 56 so as to generate the track error signal which does not depend upon the luminous intensity of the laser diode 5 and which has been standardized, the track error signal thus-generating being output to the amplifier 19A.

Figure 17:
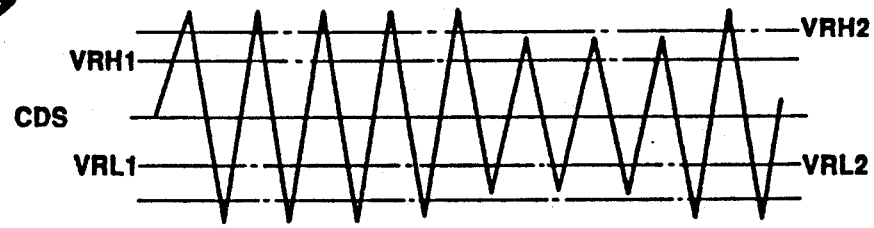
Figure 17:
Figure 17:
Figure 17:
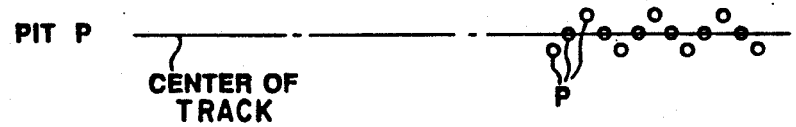

The above-described track servo system protection circuit 41A is arranged in such a manner that the upper and the lower levels of the window comparator are switched by a read/write mode signal R/W in a protection circuit 41 shown in FIG. 14. The upper and the lower levels are set to 0<VRH1<VRH2 and 0>VRL1>VRL2 as shown in FIG. 17(a). Furthermore, when the read/write mode signal R/W is in a read mode as shown in FIG. 17(b), the outer levels VRH2 and VRL2 are selected so that a wide level range.VRH2-VRL2 is set. If the same is in a write mode, the inner levels VRH1 and VRL1 are selected so that a narrow level range VRH1-VRL1 is set.

Therefore, as shown in FIG. 17(c), if the current detection signal CDS deviates from the outer level range VRH2-VRL2 in the read mode, the window comparator outputs the limit signal LM. On the other hand, the window comparator outputs the limit signal LM if the current detection signal CDS deviates from the inner level range VRH1-VRL1 in the write mode. That is, in the write mode, the range VRH1-VRL1, which is narrower than that set for the read mode, is set and a determination is made that a state, in which the track error signal does not considerably deviated from zero, is an unsatisfactory state. Therefore, the limit signal LM is output. If the counted value C made by the counter 44A exceeds the reference value L, the comparator 45A outputs an abnormality detection signal ADA to the interruption terminal of the CPU 25. In response to the abnormality detection signal ADA, the CPU 25 outputs a signal for causing the switch of the relay 20A to be switched off to cut the supply of the drive signal to the actuator coil 22A of the track actuator 21A As a result, heat generation (which can be generated if the cutting is not performed) in the actuator coil 22A is prevented. Therefore, a defect which can cause a defective insulation can be prevented and burning of the coil or the like can also be prevented.

If the abnormality detection signal ADA is supplied, the CPU 25 causes a display portion 58 comprising liquid crystal to display a fact that an abnormal state has been detected so as to notify a user of this fact (a fact that the actuator coil 22A is receiving an excessively large electric current).

Furthermore, the CPU 25 makes a determination that a undesirable recording state is realized if the abnormality detection signal ADA is supplied and if a determination is made, in accordance with the read/write mode signal R/W, that it is in the write mode. As a result, the CPU 25 outputs a record stop (record cancellation) signal WH so that the recording operation is stopped. As shown in FIG. 17(d), in, for example, an oscillatory state, the position at which pit p is formed by light emitting power is laterally (in a direction transversing the track) deviated from the central portion of the track. Information recorded in the above-described state can easily erroneously be reproduced. According to this embodiment, the recording stop signal WH is transmitted to, for example, the laser drive circuit 55 so as to forcibly maintain the drive current to be supplied to the laser diode 5 at a level at which reading can be performed. Therefore, performing of the recording in the above-described undesirable state is prevented (the similar effect can be obtained in a case where the deviation takes place in a DC manner as well as the oscillatory state). Furthermore, the fact that the undesirable recording state has been realized is displayed in the display portion 58 in this case.

Furthermore, the reference value generating circuit 46A is constituted by the dip switch.

The focus servo system is constituted in the similar manner. The output obtained from a photoelectrical conversion and transmitted from the photo-detector 11 (the photo-detector elements 11a of the photo-detector 11) is supplied to a subtracter 18B so that a focus error signal is generated. The focus error signal thus-generated is subtracted by an output signal output from the adder 56 by a subtracter 60B so as to be a standardized focus error signal before it is amplified by an amplifier 19B. The signal output from the amplifier 19B is supplied to an actuator coil 22B of a focus actuator 21B after it has passed through a resistor 32B and the switch of a relay 20B. The voltage levels at the two end terminals of the resistor 32B are supplied to a focus servo system protection circuit 41B.

The focus servo system protection circuit 41B is constituted similarly to the track servo system protection circuit 41A, wherein when abnormality detection signal ADB is supplied from a comparator 45B to the CPU 25, the CPU 25 outputs a signal which causes the switch of the relay 20B to be turned off so as to cut the supply of the drive current to the actuator coil 22B of the focus actuator 21B. As a result, heat generation in the actuator coil 22B is prevented, and a defect which can cause a defective insulation can be prevented and disconnection of the coil or the like can also be prevented. In addition, in the recording mode, a determination is made that an undesirable recording state has been realized so as to output the recording stop signal WH to, for example, the laser drive circuit 55, the determination being made prior to the moment at which the state where the actuator must be protected is realized. As a result, the drive current to be supplied to the laser diode 5 is forcibly maintained at a level at which reading can be performed. Therefore, performing of the recording in the above-described undesirable state is prevented.

Figure 18:
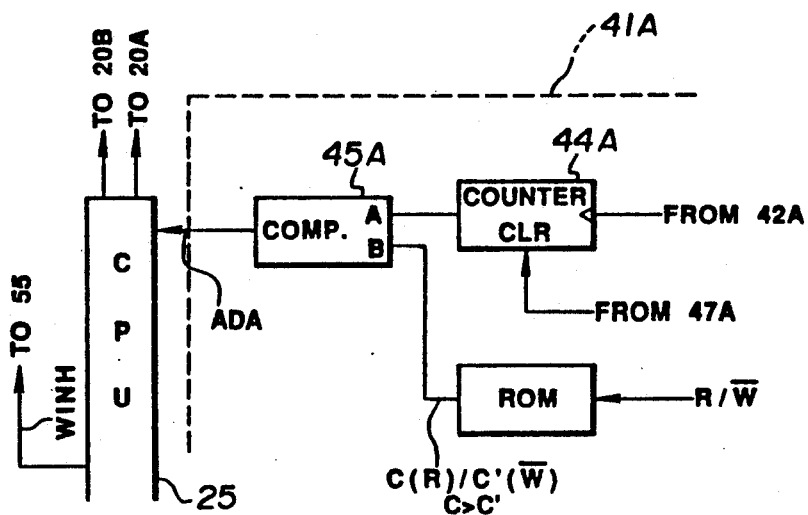
FIG. 18 is a structural view which illustrates an essential portion of a modification to the third embodiment.

Although the read/write mode signal R/$\overline{\text{W}}$ is used to switch the set range according to this embodiment, another structure may be employed which is, as shown in FIG. 18, arranged in such a manner that the reference value generating circuit 46A is constituted by a ROM, the read/write mode signal R/$\overline{\text{W}}$ is used as the signal to address the ROM, and the reference value is changed between the read mode and the write mode in such a manner that reference value C' output from the ROM in the write mode is made to be smaller than reference value C output from the ROM in the read mode, that is, C'<C.

The present invention is not limited to the optical card. It can be similarly applied to a track servo/focus servo system of an optical recording/reproducing apparatus using an optical disk or a photo-electro-magnetic disk.

Although the limit signal is, for convenience, checked at the predetermined intervals according to the above-described embodiments, the necessity of checking it at predetermined intervals can be eliminated.

In a case where the condensing lens (objective lens) is constituted by a plurality of lens systems, the necessity of displacing all of the systems in the direction which transverses the track or a direction in which the focus is adjusted can be eliminated. As an alternative to this, a portion of the systems may be displaced.

Furthermore, another structure may be employed in which the levels VRL and VRH for defining the predetermined ranges are arranged to be the first level ranges and individual second level ranges are set while changing, for example, weight. In a case where the second level range is, for example, set outside the first level range, the counting of the case in which the level exceeds the above-described range may be assumed as a plurality of times.

In addition, a structure may be arranged in such a manner that the relay is turned off when the value is smaller than the predetermined value L in a case where a multiplicity of signals, which have become active, are detected in a short period.

As described above, according to the present invention, the result of the output from the comparison means which makes a determination whether or not the drive current to be supplied to the actuator exceeds a predetermined range is fetched. Furthermore, if the fetched result is larger than a predetermined value, the supply of the drive current to the actuator is stopped. Therefore, burning of the actuator due to supplied excessively large quantity of current can be effectively prevented.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. An optical recording/reproducing apparatus comprising:
   condensing means for condensing a beam spot, which is used to record or reproduce information to and from an optical recording medium having a plurality of tracks, onto said optical recording medium;
   displacement means for displacing at least a portion of said condensing means with respect to said optical recording medium in at least either direction in which a focal point is adjusted or a direction which transverses said track;
   drive means for supplying a drive current to said displacement means;
   cutting means for cutting said drive current;
   comparison means for detecting whether or not said drive current output from said drive means exceeds a predetermined range;
   counting means for counting the number of times at which said comparison means has determined that said drive current output from said drive means exceeds said predetermined range, said counting being made in a predetermined supervisory period at every detection time the interval of which is shorter than said supervisory time;
   determination means for determining whether or not a counted value counted by said counting means exceeds a reference number; and
   control means for cutting said drive current by operating said cutting means in accordance with a determination signal denoting a fact that a determination has been made by said determination means that said counted value exceeds said reference number.

2. An optical recording/reproducing apparatus according to claim 1, wherein said displacement means is constituted by a focus actuator for displacing at least a portion of said condensing means with respect to said optical recording medium in said direction in which said focal point is adjusted and a track actuator for displacing the same in a direction which transverses said track.

3. An optical recording/reproducing apparatus according to claim 2, wherein said drive means is constituted by a focus actuator drive means and a track actuator drive means which respectively supply drive currents to said focus actuator and said track actuator.

4. An optical recording/reproducing apparatus according to claim 3, wherein said cutting means is in series connected to said track actuator so that said drive current to be supplied to said track actuator can be cut by said control means.

5. An optical recording/reproducing apparatus according to claim 3, wherein said cutting means is in series connected to said focus actuator so that said drive current to be supplied to said focus actuator can be cut by said control means.

6. An optical recording/reproducing apparatus according to claim 1, wherein said optical recording medium is a rectangular optical card.

7. An optical recording/reproducing apparatus according to claim 1, wherein said comparison means has a window type comparator the predetermined range of which is arranged to be a range between an uppermost level and a lowermost level.

8. An optical recording/reproducing apparatus according to claim 1, wherein said counting means has a clock generator for generating a clock which sets said detection time and a counter for counting signals output from said comparison means in synchronization with said clock.

9. An optical recording/reproducing apparatus according to claim 8, wherein said supervisory period is formed by a counter for dividing said clock.

10. An optical recording/reproducing apparatus according to claim 1, wherein said cutting means is constituted by an electromagnetic relay.

11. An optical recording/reproducing apparatus according to claim 1, wherein said determination means is constituted by a comparator for determining whether or no said counted value counted by said counting means and supplied to one of input terminals exceeds said reference value supplied to another input terminal.

12. An optical recording/reproducing apparatus according to claim 1, wherein said determination means has a reference value changing means capable of changing said reference value.

13. An optical recording/reproducing apparatus according to claim 12, wherein said reference value changing means is constituted by a dip switch.

14. An optical recording/reproducing apparatus according to claim 12, wherein said reference value changing means is constituted by a ROM.

15. An optical recording/reproducing apparatus according to claim 1, wherein said determination means determines whether or not said counted value exceeds said predetermined value whenever said supervisory period is ended.

16. An optical recording/reproducing apparatus according to claim 1, wherein said determination means determines whether or not said counted value exceeds said predetermined value as well as in said supervisory period.

17. An optical recording/reproducing apparatus according to claim 1 further comprising notifying means for notifying user of an abnormal sate in a case where said determination has made a determination that said counted value exceeds said reference number.

18. An optical recording/reproducing apparatus according to claim 1, wherein said comparison means has change means capable of changing said predetermined range between a recording mode in which information is recorded to said optical recording medium and a reproducing mode in which recorded information is reproduced.

19. An optical recording/reproducing apparatus according to claim 18, wherein said change means narrows said predetermined range in a case of said recording mode in comparison to the range for said reproducing mode.

20. An optical recording/reproducing apparatus according to claim 1, wherein said determination means has change means capable of changing said reference value between a recording mode in which information is recorded to said optical recording medium and a reproducing mode in which recorded information is reproduced.

21. An optical recording/reproducing apparatus according to claim 20, wherein said change means makes said reference value to be smaller than that set for said reproducing mode.

22. An optical recording/reproducing apparatus according to claim 1 further comprising recording stop means for stopping recording in a case where said determination means has made a determination that said counted value exceeds said reference number in said recording mode in which information is recorded to said optical recording medium.

* * * * *